United States Patent [19]

Ozawa et al.

[11] 4,360,549
[45] Nov. 23, 1982

[54] MOLDING

[75] Inventors: Isao Ozawa, Inazawa; Yutaka Nagai, Aichi; Yoshihiro Menjo, Chiryu, all of Japan

[73] Assignee: Toyoda Gosei Co., Ltd., Japan

[21] Appl. No.: 242,983

[22] Filed: Mar. 12, 1981

[30] Foreign Application Priority Data

Sep. 12, 1979 [JP] Japan ................................ 54-116965
Apr. 18, 1980 [JP] Japan .................................. 55-52130

[51] Int. Cl.³ ......................... B32B 3/30; B60R 13/04
[52] U.S. Cl. ...................................... 428/31; 49/462; 293/1; 293/128; 428/71
[58] Field of Search ............... 428/71, 117, 31; 293/1, 293/128; 49/462; 52/716, 717, 718; 114/219

[56] References Cited

U.S. PATENT DOCUMENTS 2,061,569 11/1936 Fischer ........................... 428/117 X
3,606,431 9/1971 Kunevicius ...................... 428/31 X
3,606,433 9/1971 Kunevicius ...................... 428/31 X
3,987,134 10/1976 Shiina et al. ..................... 428/71 X

FOREIGN PATENT DOCUMENTS 53-45838 11/1978 Japan .
53-149317 11/1978 Japan .
1364002 8/1974 United Kingdom .................. 428/31

Primary Examiner—Henry F. Epstein
Attorney, Agent, or Firm—Leitner, Palan, Martin & Bernstein

[57] ABSTRACT

In a molding composed of a molding body comprising a front surface, a bottom, a side portion and a hollow portion, and of an adhesive layer constituted at the bottom, the thin molding side portion extends along the front surface, and the bottom is provided with a projection which projects on one side or both sides of the bottom separate from the front surface and the molding side portion. When the front surface is pushed, the pushing force applied to the front surface produces the fulcrum of the bending moment at the molding side portion and the plane pressure from the fulcrum to the front surface in the direction towards the inside of the bottom, and at the same time the contact pressure applied to the point of action of force is distributed in the plane pressure distribution towards the front surface which attenuates from the peak value below the point of action of force to both sides gradually.

12 Claims, 16 Drawing Figures

MOLDING

BACKGROUND OF THE INVENTION

The present invention relates to protective and decorative moldings made of plastic resin or rubber. More specifically, the invention relates to a hollow molding with adhesive layer on the rear surface to utilize adhesive force of the layer and prevent failure of adhesion.

So-called hollow molding, i.e. molding having hollow portion inside the molding body has been used in automobiles or the like for the purpose of weight reduction, absorption of shock force or saving of raw material.

Particularly in moldings for automobiles, use of larger size is seen in recent years. Molding of larger size even in hollow type inevitably increases in weight. Since necessary rigidity and strength limit material and size, increase of weight results in decrease of adhesive force in the adhesive layer. In addition, the adhesive layer usually comprises double-coated adhesive tape.

The decrease of adhesive force in large-size hollow molding is significantly seen in automobiles. Automobiles are subjected to thermal variation in higher or lower temperatures and influence of vibration from the use condition and environment, and as the size of molding increases the variation in expansion and depression and the vibration significantly influences the adhesive force.

It is found that the decrease of adhesive force occurs from another reason hereinafter described. Referring to FIG. 12, conventional hollow molding 11 comprises a molding body 12, a hollow portion 13 constituted within the body 12, and an adhesive layer 14 on the rear surface. The molding body 12 comprises a front surface 15, a side portion 16, and a bottom 17. When the hollow molding 11 is pushed against a substance A for adhesion using a jig B such as a roll, both side ends are apt to be moved upwards as shown in FIG. 13. Therefore the pushing force for adhesion is not applied sufficiently to both side ends. The reason therefore is described as follows.

Referring to FIG. 14, when the molding is pushed by the roll, the contact pressure F in the vertical direction and the bending moment MF act between the front surface 15 and the side portion 16. Against the contact pressure F and the bending moment MF, reaction W towards the front surface and reactive moment MW act on the adhesive layer 14 of the bottom 17. If the contact pressure F and the reaction W act in a line, of if the reaction W is to the side of the bending moment MF, the bending moment MF and the reactive moment MW are suppressed and decreased, thereby the pushing force applied to the molding front surface 15 is transmitted properly to the adhesive layer 14 and sufficient adhesive force is obtained. In the opposite conditions to the above described, however, the bending moment increases and most of the pushing force applied to the molding acts as the bending moment and the reactive moment, thereby the molding body is moved upwards at both side ends as shown in FIG. 13 and sufficient contact pressure is not transmitted to the adhesive layer, resulting in failure of adhesion.

Referring to FIGS. 15 and 16, relation of the contact pressure and the bending moment will be described in detail. The pushing force applied by a roll or the like acts as the contact pressure F at the point of action of force P and the bending moment MF at the fulcrum Q. The contact pressure F is distributed in plane pressure distribution (arrow designation) as shown in FIG. 15. The plane pressure W attenuates from the point of action of force towards both side ends. The plane pressure at the hollow portion is negligible. Relation between the contact pressure F and the plane pressure W is represented by following equation.

$$\int w\,dx + F = 0$$

That is, addition of integration of the plane pressure W and the contact pressure F becomes 0. Relation between the bending moment MF and the plane pressure balanced to this is represented by following equation.

$$\int w \cdot x\,dx + MF = 0$$

That is, addition of the bending moment and the plane pressure balanced to this becomes 0.

The plane pressure in summation of components of FIG. 15 and FIG. 16 contributes to adhesion in the adhesive layer. If the pressure acting towards the rear surface of molding is positive, it directly contributes to the adhesive force; if negative, it acts to peel the molding from adhesive state. Now, state of various portions in conventional hollow molding will be studied by summing the plane pressure distribution corresponding to the contact pressure and the plane pressure balanced to the bending moment. At the point of action of force P, since the fulcrum Q of the bending moment is disposed to the bottom, the plane pressure balanced to the bending moment becomes 0 thereby the plane pressure (positive) corresponding to the contact pressure contributes to the adhesive force completely. Going from the point P towards the end of the molding side portion, since the plane pressure (positive) corresponding to the contact pressure decreases and the plane pressure (negative) balanced to the bending moment increases, pressures contributing to the adhesive force significantly decreases. At the end, the plane pressure distribution (positive pressure) corresponding to the contact pressure becomes approximately zero and only the plane pressure (negative pressure) balanced to the bending moment acts, thereby pressure contributing to the adhesive force becomes negative and acts to peel the molding, resulting in upward movement of both ends of the molding side portion as above described.

SUMMARY OF THE INVENTION

An object of the present invention is to provide a hollow molding in which the pushing force applied to the molding is effectively converted into the adhesive force, by increasing the force applied to the pushed molding in the vertical direction, i.e. the contact pressure F, decreasing the bending moment, offsetting the bending moment by the reaction W, and producing the reactive moment to contribute to the adhesive force.

In order to attain the above object, the present invention is in a molding composed of the molding body comprising the front surface, side portion and bottom, and of the adhesive layer constituted at the bottom, characterized in that the thin molding side portion extends along the front surface, a projection projects on one side or both sides of the bottom, a chamber is constituted between the projection and the molding side portion, and the hollow portion and the chamber are communicated with each other above the projection or separated by means of a rib deformed under pressure, and that when the front surface is pushed the side portion provides the fulcrum of bending moment caused by the pushing force applied to the front surface, plane pressure is produced from the fulcrum to the molding front surface in the direction towards the inside of the bottom, and the contact pressure applied to the point of action of force is distributed in the surface pressure distribution towards the molding front surface so that the contact pressure gradually attenuates from the peak value below the point of action of force towards both sides.

DESCRIPTION OF THE PREFERRED EMBODIMENTS

Figure 1:
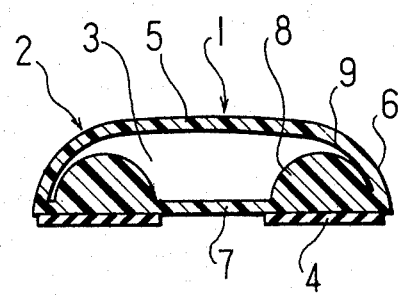
FIG. 1 is a sectional view of a molding as an embodiment of this invention.

FIG. 1 shows an embodiment of the present invention. A molding 1 is composed of a molding body 2 and an adhesive layer 4. The molding body 2 encloses a hollow portion 3, and comprises a front surface 5, a side portion 6 and a bottom 7. A projection 8 of semi-circular cross-section projects on both sides of the bottom 7. The molding side portion 6 is connected to the front surface 5 with about equal thickness and a chamber 9 is constituted between the side portion 6 and the projection 8. The chamber 9 is communicated with the hollow portion 3 above the projection 8. The molding body 2 can be molded by means of extrusion of polyvinyl chloride resin for example. However, any resin having rigidity and elasticity suitable for the use object may be molded, and there is no particular restriction regarding the material, molding method or the like.

Butyl rubber tape with adhesive agent coated on both surfaces (usually called "double-coated tape") is preferably used in the adhesive layer 4, but use is not restricted to this tape.

Figure 9:
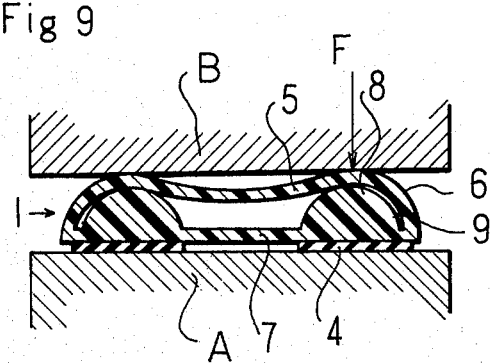
FIG. 9 is a sectional view illustrating behavior of the molding in FIG. 1 during adhesion by means of contact pressure jig.

Function of molding at installation state according to this invention is now to be described referring to FIG. 9. The molding 1 is pushed against a substance A for adhesion using a pressure jig B such as a roll and is adhered to the substance A with adhesive agent as the adhesive layer 4 in the rear surface. On the contrary to the prior art, the molding according to this invention is provided with the side portion 6 thinner and with the projection 8 constituted on both sides of the bottom 7 through a chamber 9, thereby the pushing force applied to the end of the front surface 5 makes the front surface 5 contact with the projection 8 and produces the force in the vertical direction, i.e. the contact pressure F. Since the front surface 5 and the side portion 6 are connected through thinner portion and constitute the chamber 9, the fulcrum Q of the bending moment caused by the pushing force in the front surface 5 is transferred to lower portion of the side portion 6. Thereby the plane pressure produced by this bending moment acts in the opposite direction to that of prior art and contributes to the adhesive force. Accordingly, the pushing force to the molding effectively acts as the adhesive force, and the adhesive force in the adhesive layer is fully utilized to obtain the secure adhesion.

Figure 10:
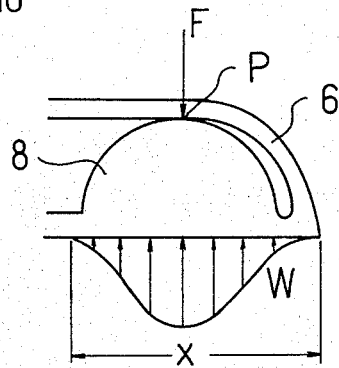
FIG. 10 is a diagram illustrating relation of the contact pressure in the molding of FIG. 1 and the corresponding plane pressure distribution.
Figure 11:
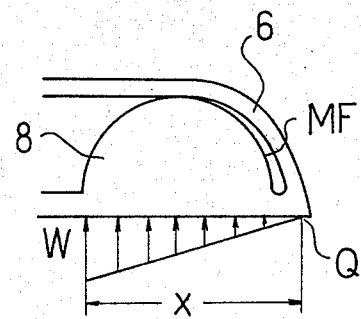
FIG. 11 is a diagram illustrating relation of the bending moment in the molding of FIG. 1 and the plane pressure distribution balanced thereto.
Figure 12:
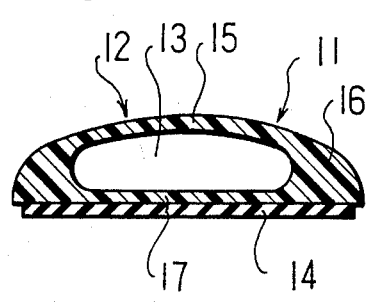
FIG. 12 is a sectional view of a hollow molding in the prior art.
Figure 13:
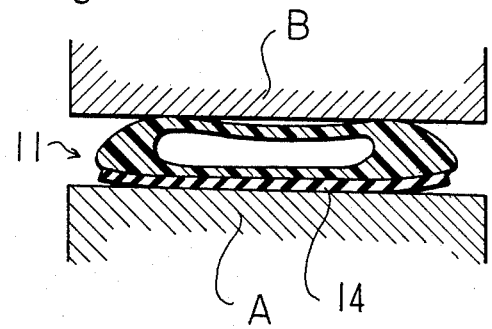
FIG. 13 is a sectional view illustrating behavior of the hollow molding in the prior art during adhesion by means of contact pressure jig.
Figure 14:
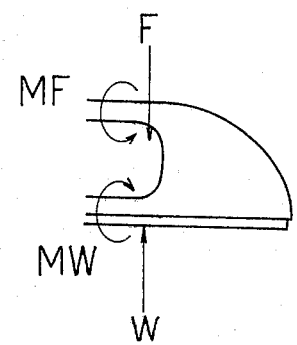
FIG. 14 is a model diagram illustrating relation of forces produced by the pushing force in the hollow molding of the prior art.
Figure 15:
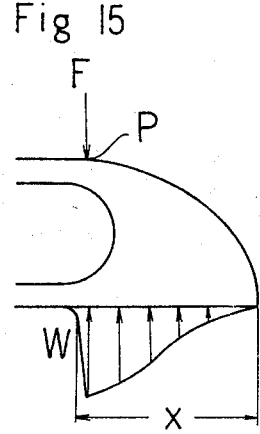
FIG. 15 is a diagram illustrating relation of the contact pressure in the molding of the prior art and the corresponding plane pressure distribution.
Figure 16:
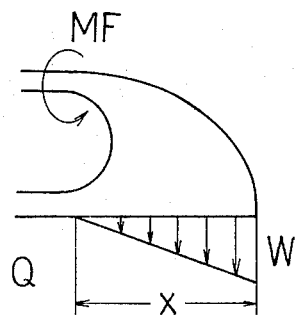
FIG. 16 is a diagram illustrating relation of the bending moment in the molding of the prior art and the plane pressure distribution balanced thereto.

Referring to FIG. 10 and FIG. 11, relation between the contact pressure applied to the molding and the bending moment in the present invention will be described in the acting diagram similar to conventional molding.

The contact pressure F caused by the pushing force applied to the molding front surface is applied to the point of action of force P at the top end of the projection 8. The plane pressure distribution corresponding to the contact pressure is effected so that the pressure W attenuates from the peak value at the point of action of force P towards both side ends in the molding front surface as shown in figures. As above mentioned, relation between the contact pressure F and the surface pressure W is represented in following equation.

$$\int w\,dx + F = 0$$

The bending moment MF acts to the lower portion Q as fulcrum in the molding side portion 6 as in FIG. 10. Accordingly, the surface pressure W equals 0 at the fulcrum Q and increases towards the projection 8 inside the molding, and the value of surface pressure acts to the molding front surface (positive direction). Integration of the surface pressure becomes the reactive moment. As above described, relation between the bending moment MF and the surface pressure W is represented by following equation.

$$\int w \cdot x\,dx + MF = 0$$

In the molding according to this invention as seen from FIG. 10 and FIG. 11, since both the contact pressure F according to pushing force and the plane pressure W balanced to the bending moment act towards the molding front surface, i.e. in the positive direction, addition of both forces acts to increase the adhesive force. Therefore, function of pressure-sensitive double-coated tape in the adhesive layer can be fully utilized without minus effect and strong adhesive force can be obtained.

Even if the adhesive layer is constituted in intermediate portion of the bottom opposite to the hollow portion 3, little amount of the adhesive force can be obtained. Therefore the adhesive layer is not constituted in the intermediate portion, and the design of the adhesive strength is so carried out that sufficient adhesive force is obtained only at both ends having the projection 8. Since the intermediate portion of the bottom without adhesive layer does not substantially have the function as molding, only the projection with the adhesive layer constituted thereon may remain and the intermediate portion of the bottom may be omitted.

Corresponding to the use state of the molding, the projection may be constituted on one side instead of both sides as above embodiment. In the molding of large size, the molding can be constituted at the center in addition to both sides.

Figure 2:
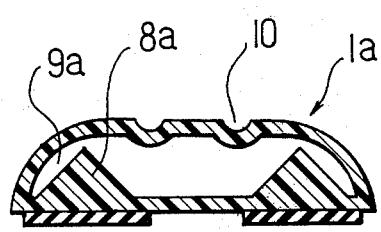
FIG. 2 is a sectional view of a molding as another embodiment of this invention.

FIG. 2 shows another embodiment of the present invention. Essential difference of a molding 1a from the embodiment of FIG. 1 is in a projection 8a with triangular cross-section. Corresponding to this, shape of a chamber 9a is different from FIG. 1 and constituted in large space. A groove 10 is constituted on the front surface for decorative purpose.

Figure 3:
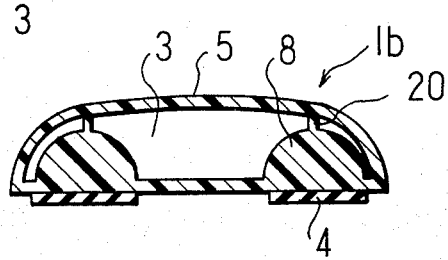
FIG. 3 is a sectional view of a molding as modification of FIG. 1 having a rib separating the hollow portion and the chamber.

FIG. 3 shows a molding 1b in modification of FIG. 1. A rib 20 deformed under pressure is provided between the top end of the projection 8 and the rear side of the front surface 5 i.e. for separating the hollow portion 3 and the chamber 6. The rib 20 serves as the shape holding in the molding front surface 5. The rib 20 may be fixed to either the front surface 5 or the projection 8. Otherwise, the rib 20 may be fixed to both the front surface 5 and the projection 8.

Figure 4:
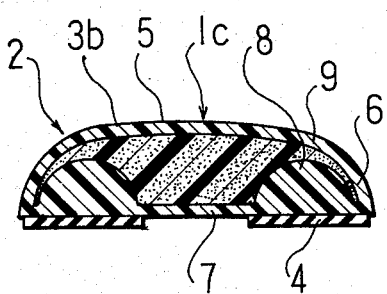
FIG. 4 is a sectional view of a molding in which the hollow portion of FIG. 1 is filled with soft foamed material.

FIG. 4 shows a molding 1c in modification of FIG. 1. The hollow portion and the chamber in FIG. 1 are filled by soft foamed material into a foamed portion 3b.

The foamed portion 3b may be of soft foamed material with restorable and resilient property. Foamed material comprising urethane, polyvinyl chloride resin and polyolefin resin may be used. The foamed portion is constituted by the extrusion molding integral with the molding body 2 or by that the foamed portion separately molded is made integral with the molding body by means of bonding or welding, or that the foamed portion separately molded is inserted to the molding body.

Figure 5:
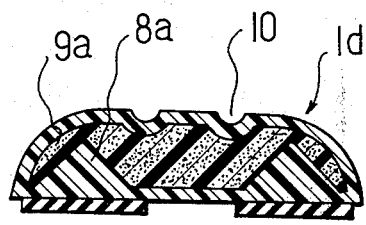
FIG. 5 is a sectional view of a molding in which the hollow portion of FIG. 2 is filled with soft foamed material.

FIG. 5 shows a molding 1d in modification of FIG. 2 The hollow portion and the chamber in FIG. 2 are filled by soft foamed material.

Figure 6:
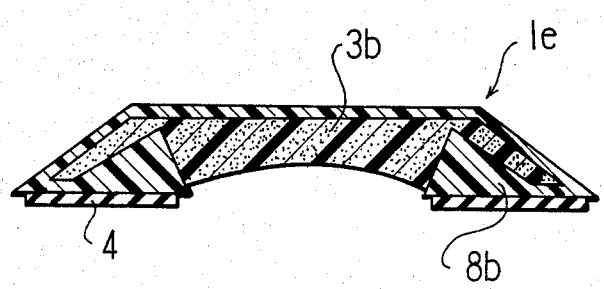
FIG. 6 is a sectional view of a molding as a further embodiment of this invention.

FIG. 6 shows a molding 1e in a further embodiment of the present invention. Only the projection with the adhesive layer 4 thereon is made remain and the intermediate bottom is omitted.

Figure 7:
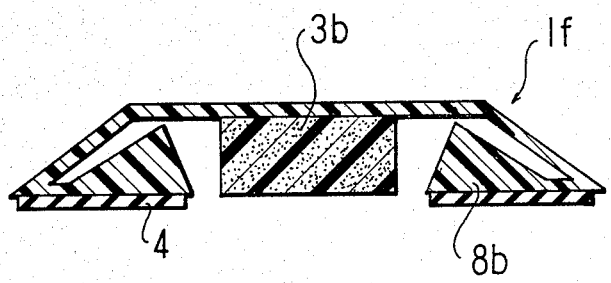
FIG. 7 is a sectional view of a molding in which the soft foamed material of FIG. 5 is constituted only at the center.

FIG. 7 shows a molding 1f wherein the foamed portion 3b in FIG. 5 is constituted only at the center.

Figure 8:
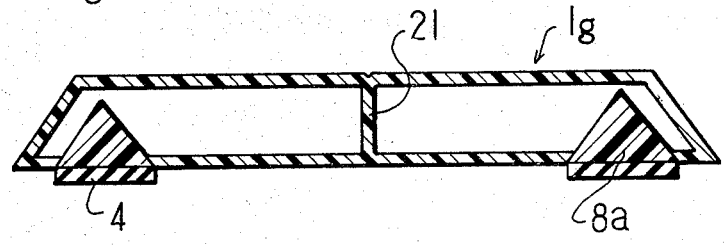
FIG. 8 is a sectional view of a molding as still another embodiment of this invention in which the porjection is made of another material with rigidity higher than that of the molding body.

FIG. 8 shows a molding 1g in still another embodiment of the present invention. The projection 8a is made of another material with rigidity higher than the molding body. Thereby the contact pressure is effectively transmitted to the adhesive layer. The projection 8a may be extruded integral with the molding body, or the projection separately molded may be made integral with the body by means of bonding or welding later. Numeral 21 designates a shape holding rib constituted in the intermediate portion of the molding.

In addition, behavior during adhesion by means of contact pressure jig in FIGS. 3~8 is similar to that in FIG. 1.

What is claimed is:

1. Molding composed of a unitary elastomeric molding body comprising a front surface, a bottom, a side portion and a hollow portion, and of an adhesive layer constituted at the bottom, characterized in that the thin molding side portion extends along the front surface, a projection projects on one side or both sides of the bottom, a chamber is constituted between the projection and the molding side portion, and the hollow portion and the chamber are communicated with each other above the projection whereby a fulcrum results at the lower outer edge of the side wall when pressure is applied to said front surface and said projection to produce a bending moment which aides the adhesive force.

2. Molding according to claim 1, characterized in that said hollow portion and said chamber are wholly or partially filled with soft elastomeric foamed material.

3. Molding according to claim 1, characterized in that said projection is made of another material with rigidity higher than that of the molding body.

4. Molding according to any of claims 1~3, characterized in that said bottom is constituted only at portion on which the projection projects.

5. Molding according to any of claim 1~3, characterized in that said projection has semi-circular cross-section.

6. Molding according to any of claims 1~3, characterized in that said projection has triangular cross-section.

7. Molding composed of a unitary elastomeric molding body comprising a front surface, a bottom, a side portion and a hollow portion, and of an adhesive layer constituted at the bottom, characterized in that the thin molding side portion extends along the front surface, a projection projects on one side or both sides of the bottom, a chamber is constituted between the projection and the molding side portion, and a rib deformable under pressure is provided between the front surface and the projection for separating the hollow portion and the chamber whereby a fulcrum results at the lower outer edge of the side wall when pressure is applied to said front surface and said projection to produce a bending moment which aides the adhesive force.

8. Molding according to claim 7, characterized in that said hollow portion and said chamber are wholly or partially filled with soft elastomeric foamed material.

9. Molding according to claim 7, characterized in that said projection is made of another material with rigidity higher than that of the molding body.

10. Molding according to any of claims 7~9, characterized in that said bottom is constituted only at portion on which the projection projects.

11. Molding according to any of claims 7~9, characterized in that said projection has semi-circular cross-section.

12. Molding according to any of claims 7~9, characterized in that said projection has triangular cross-section.

* * * * *